United States Patent [19]

Shilling

[11] Patent Number: 5,615,115
[45] Date of Patent: Mar. 25, 1997

[54] METHOD OF DETERMINING PORE PRESSURE AND FRACTURE GRADIENT PROFILES USING SEISMIC TRANSIT TIMES

[75] Inventor: Roy B. Shilling, Dallas, Tex.

[73] Assignee: Atlantic Richfield Company, Los Angeles, Calif.

[21] Appl. No.: 356,139

[22] Filed: Dec. 15, 1994

[51] Int. Cl.⁶ .................................................. G06F 19/00
[52] U.S. Cl. ........................................... 364/421; 364/422
[58] Field of Search .................................... 364/421, 422; 367/38, 25; 395/929

[56] References Cited

U.S. PATENT DOCUMENTS

| | | | |
|---|---|---|---|
| 5,128,866 | 7/1994 | Weakley | 364/421 |
| 5,130,949 | 7/1992 | Kan et al. | 367/27 |
| 5,200,929 | 4/1993 | Bowers | 367/38 |
| 5,233,568 | 8/1993 | Kan et al. | 364/422 |
| 5,282,384 | 2/1994 | Holbrook | 364/422 |
| 5,311,484 | 5/1994 | Anderson et al. | 367/38 |
| 5,343,440 | 8/1994 | Kan et al. | 364/421 |

OTHER PUBLICATIONS

Eaton, "The Equation for Geopressure Prediction from Well Logs," SPE 5544 (Society of Petroleum Engineers of AIME, 1975).
Gardner, et al., "Formation Velocity and Density—The Diagnostic Basis for Statigraphic Traps," *Geophysics*, vol. 39, No. 6 (Dec. 1974), pp. 770–771.
Eaton, "Fracture Gradient Prediction and its Application in Oilfield Operations," *Transactions of SPE 43rd Annual Fall Meeting of SPE*, vol. 46, (American Institute of Mining, Metallurgical and Petroleum Engineers, 1969).
Daines, "Prediction oif Fracture Pressures for Wildcat Wells", Journal of Petroleum Technology (Society of Petroleum Engineers of AIME, Apr. 1982).
Matthews, et al., "Hot to predict formation pressure and fracture gradient," The Oil and Gas Journal, (Feb. 20, 1967) pp. 92–106.
Gill, "Well logs reveal true pressure where drilling responses fail," Oil and Gas Journal, (Mar. 1987).
Christman, "Offshore Fracture Gradients," *Journal of Petroleum Technology* Aug. 1973) pp. 910–914.

*Primary Examiner*—Donald E. McElheny, Jr.
*Attorney, Agent, or Firm*—Anderson, Levine & Lintel

[57] ABSTRACT

A method of generating a two-dimensional pore pressure gradient and fracture gradient cross section from seismic survey data is disclosed. In general, the method includes generation of a two-dimensional overburden gradient cross section and a two-dimensional normal compaction trend line cross section. The two-dimensional overburden gradient and normal compaction trend line cross sections are preferably generated by extrapolating the overburden gradient and normal compaction trend lines at an existing offset well, after correlating seismic interval transit times to the density and well log data at the offset well location. Once the two-dimensional overburden gradient cross section and two-dimensional normal compaction trend line cross section are generated, the Eaton method is applied at each of the common depth points of interest to produce a two-dimensional pore pressure gradient cross section, at least at certain common depth points of interest. Poisson's ratio for rocks can also be applied to the pore pressure gradients, to produce a two-dimensional fracture gradient cross section. Accurate pore pressure and fracture gradient information at locations away from existing offset wells can thus be generated.

13 Claims, 8 Drawing Sheets

METHOD OF DETERMINING PORE PRESSURE AND FRACTURE GRADIENT PROFILES USING SEISMIC TRANSIT TIMES

This invention is in the field of hydrocarbon well planning, and is more particularly directed to the determination of pore pressure and fracture gradient profiles at locations where hydrocarbon wells may be drilled.

BACKGROUND OF THE INVENTION

In the field of oil and gas production, the design of new wells has become a critical factor in minimizing drilling cost and in ensuring successful production. Proper well planning includes such factors as the weight of the drilling mud to be used during the drilling operation, and the necessity for and design of casing strings. The selection and planning of mud weight and casing depend primarily upon the pore pressure of fluid bearing formations below the surface of the earth.

On one hand, the drilling mud weight cannot exceed the pressure at which a formation will fracture. Fracture of the formation at the wellbore can cause loss of circulation of the drilling mud, since the mud can escape from the wellbore into the surrounding lithology. Accordingly, low pressure zones that are vulnerable to such fracturing must be detected, and the appropriate precautions taken, so that such fracturing and loss of mud circulation does not occur.

Conversely, if the mud weight is significantly less than that of the pore pressure of a formation, a disastrous "blowout" condition can occur, in which the fluid from the formation pushes the drilling mud out of the wellbore. As such, a particular problem in the design and execution of a well is the possibility of encountering so-called "overpressurized zones" in the subsurface geology.

As is well known in the art, hydrostatic pressure increases with depth from the surface. Since fluid is not compressible, any fluid located in permeable rock formations tends to become squeezed out therefrom as the hydrostatic pressure increases with increasing depths. However, if surrounding formations "seal" a region of permeable rock, the fluid contained therein cannot be expelled from the region. As more and more sedimentation accrues over geologic time, and thus as the overburden increases, the fluid in these regions carry more and more "weight"; in many cases, the trapped fluid supports the formation, which is indicated by greater than typical porosity for the formation. Since the resulting fluid pressure in these zones are abnormally large as compared to zones where the fluid has been above to migrate, these zones are referred to in the art as "overpressurized zones". These zones are also referred to as "geopressure" zones, since the pore pressure in these formations resulting from the trapping of fluids is greater than the hydrostatic pressure at the corresponding depths.

Proper well planning becomes even more complicated where overpressurized zones underlie low pressure zones, as is typical in certain parts of the world; in this condition, if the drilling mud weight is increased to the extent necessary to avoid a blowout, this mud weight can fracture the overlying low pressure zone. In this case, the well plan will require casing strings to be set at the intermediate depths of the low pressure zones to protect those formations vulnerable to fracturing from the pressure of the heavier drilling mud. Factors such as the depth of the settings for the casing, the casing weight, size of the hole, and the like must also be selected. Of course, while avoidance of blowouts is of primary concern, the use of intermediate casing strings in a well is quite costly, and is therefore preferably minimized to the extent necessary.

Accordingly, as is well known in the art, the estimation of pore pressure at varying depths below the location of a proposed well is essential in proper well planning. Several methods are known in the art for estimating pore pressures in formations, using well log data and also from seismic survey information.

One such method is well known in the art as the "Eaton" method, and is described at Eaton, "The Equation for Geopressure Prediction from Well Logs" SPE 5544 (Society of Petroleum Engineers of AIME, 1975). The Eaton method of determining pore pressures begins with determination of the so-called "normal compaction trend line" based upon sonic, resistivity, conductivity, or d-exponent data obtained by way of well logs. The normal compaction trend line corresponds to the increase in formation density (indicated by sonic travel time, resistivity or conductivity) that would be expected as a function of increasing depth due to the increasing hydrostatic pressure that forces fluids out from the formations and thus increases sonic travel time, assuming the absence of geopressure. This normal compaction trend line may be determined solely from the sonic travel time, conductivity, or resistivity well log data, or may be adjusted to reflect extrinsic knowledge about the particular formations of interest. The Eaton method calculates pore pressure by correlating the measured density information, expressed as an overburden gradient over depth, to deviations in measured sonic travel time, (or electrical resistivity or conductivity) from the normal compaction trend line at specific depths. The pore pressure calculated from the Eaton equations has been determined to be quite accurate, and is widely used in conventional well planning.

However, application of the Eaton method has been limited to the immediate locations of existing wells, as it depends on well log data. It is of course desirable to estimate pore pressure at locations at the sites of proposed new wells, and thus away from currently existing wells, particularly to identify locations at which production will be acceptable at a low drilling cost (e.g., minimal use of intermediate casing). In addition, knowledge of pore pressure at locations away from existing wells enables intelligent deviated or offset drilling, for example to avoid overpressurized zones.

Another well known method of estimating pore pressure during drilling correlates pressure gradient information determined from the mud weight profile in the well with deviations in seismic two-way transit times from that expected by the normal compaction trend line. Regression techniques are then used to derive a predicted pore pressure to interval transit time relationship. As described in U.S. Pat. No. 5,130,949, issued Jul. 14, 1992, assigned to Atlantic Richfield Company and incorporated herein by reference, once the relationship of interval transit time to pore pressure is empirically determined, one may estimate pore pressures at locations away from an actual well by applying the relationship to interval transit times determined by common depth point (CDP) gathers of seismic survey data.

It is an object of the present invention to provide a method of determining pore pressures at locations away from the locations of actual wells, in order to perform well planning in advance.

It is a further object of the present invention to provide such a method which does not rely on regression estimation and curve fitting.

It is another object of the present invention to provide such a method that may be used on existing data in an automated manner.

Other objects and advantages of the invention will become apparent to those of ordinary skill in the art having reference to the following specification together with its drawings.

SUMMARY OF THE INVENTION

The invention may be incorporated into an automated data analysis system having access to seismic data sets and also to well log information from a currently existing well. A two-dimensional ("2-D") cross section overburden gradient is determined for the region of interest; the overburden gradient corresponds to the rate of change of stress in the formation over depth. It is contemplated that the 2-D overburden gradient will primarily be obtained using an overburden gradient determined at an offset well location, correlating the overburden gradient to seismic survey data at the well location, and then generating an extrapolated 2-D overburden gradient cross section from the interval transit times of common depth point (CDP) gathers in the region. According to the method of the invention, a 2-D normal compaction trend line cross section is then determined, for example by extrapolation from a logged offset well; alternatively, normal compaction trend lines may be derived from formation knowledge and other assumptions for one or more of the CDPs. The method then generates a 2-D pore pressure cross section by performing the calculations of the Eaton method at varying depths for selected CDPs, using the values of the 2-D overburden gradient cross section and the 2-D normal compaction trend line cross section. Application of 2-D Poisson's trend curve cross section to the pore pressure will also provide fracture gradient prediction over the 2-D cross section.

DETAILED DESCRIPTION OF THE PREFERRED EMBODIMENT

Figure 1:
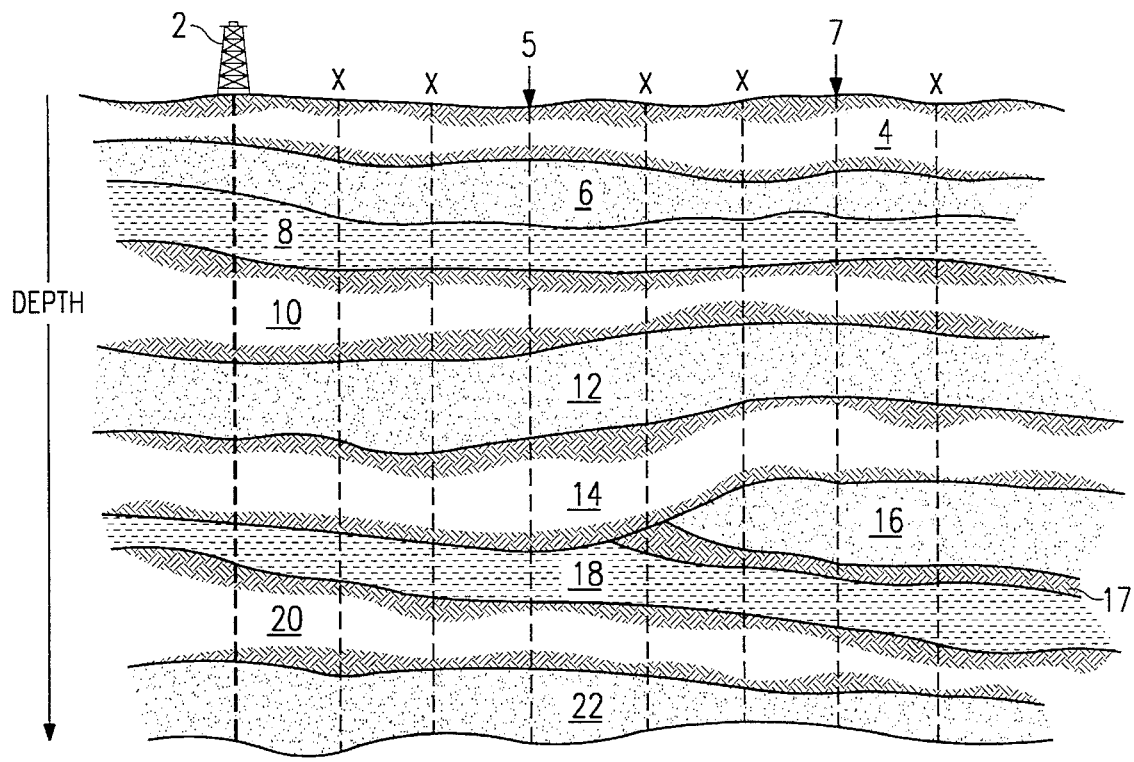
FIG. 1 is a cross-section diagram of the earth, illustrating an exemplary region to which the method of the preferred embodiment of the invention will be applied.

Referring first to FIG. 1, an exemplary cross-section of the earth is illustrated for purposes of explanation of the preferred embodiment of the present invention. FIG. 1 illustrates a portion of the earth at which a previously drilled hydrocarbon well 2 is present. Well 2 extends from the surface of the earth through a series of subsurface strata, or formations, of various composition and thus of varying pore pressure and fracture gradient. As discussed hereinabove, the term "pore pressure" refers to the pressure applied to fluid in the pores of a particular formation; fluid in a formation that is not sealed will be subjected only to hydrostatic pressure which varies according to the depth of the formation, while fluid that is sealed within a formation may also be subjected to an additional overburden stress, or geopressure. The term "fracture gradient" refers to the stress required to fracture the formation, as a function of depth; fracture gradient is a useful parameter, as it will indicate the maximum fluid pressure to be applied within a wellbore at the particular formation, without risking loss of drilling mud circulation.

While the example of FIG. 1 illustrates land-based drilling, it is of course to be understood that the present invention, including the preferred embodiment described herein, is also directly applicable to marine surveys and drilling operations.

In the example of FIG. 1, as noted above, well 2 is already present and has been drilled through formations 4, 6, 8, 10, 12, 14, 18, 20 and 22. As is usually the case in modern drilling operations, well logs have been run within well 2, so that density and other parameters concerning these formations have been evaluated at the location of well 2. In addition, seismic survey information has also been obtained from the region of interest, with common depth point (CDP) gathers having been done (or available) for each of the surface locations X of FIG. 1. Well locations 5 and 7, each corresponding to a CDP gather, are proposed surface locations at which drilling of wells is being considered in this example. From the viewpoint of proposed drilling locations 5, 7, existing well 2 is an "offset" well, as it is a location spaced away therefrom.

If, for example, the formations of the example of FIG. 1 are primarily shales and sands, such as are typically encountered, formations 12 and 16 may be sandy formations, which will therefore be quite porous and contain recoverable hydrocarbons. In this example, the pore pressure for formations 12, 16 will be slightly above the hydrostatic pressure otherwise expected at those depths. Deeper formations, such as formation 18, may be heavily overpressurized zones, and one in which risk of blowouts may be present. In the example of FIG. 1, the well planner may drill a well from either of proposed drilling locations 5, 7, and thus the well planner has a need to determine the pore pressures and fracture gradients for the formations below proposed drilling locations 5, 7. With this information, the well planner can select which location at which a new well is to be placed and also the directionality of the well (i.e., the trajectory of the well path). In addition, the pore pressure and fracture gradient cross section will allow for proper well design, such that such casing as is necessary can be set to protect low pressure zones from fracturing, while still avoiding blowouts from overpressurized zones such as formation 18.

As will be described in further detail hereinbelow, the preferred embodiment of the invention is directed to providing a pore pressure cross section of a proposed drilling region such as that shown in FIG. 1. This pore pressure cross section will consist of a representation of pore pressure as a function of depth and lateral position; furthermore, as will also be described hereinbelow, a fracture gradient cross section may also be derived according to the preferred embodiment of the invention. Each of these cross sections will assist in the site selection and well design for a proposed hydrocarbon well in the survey region.

Figure 2:
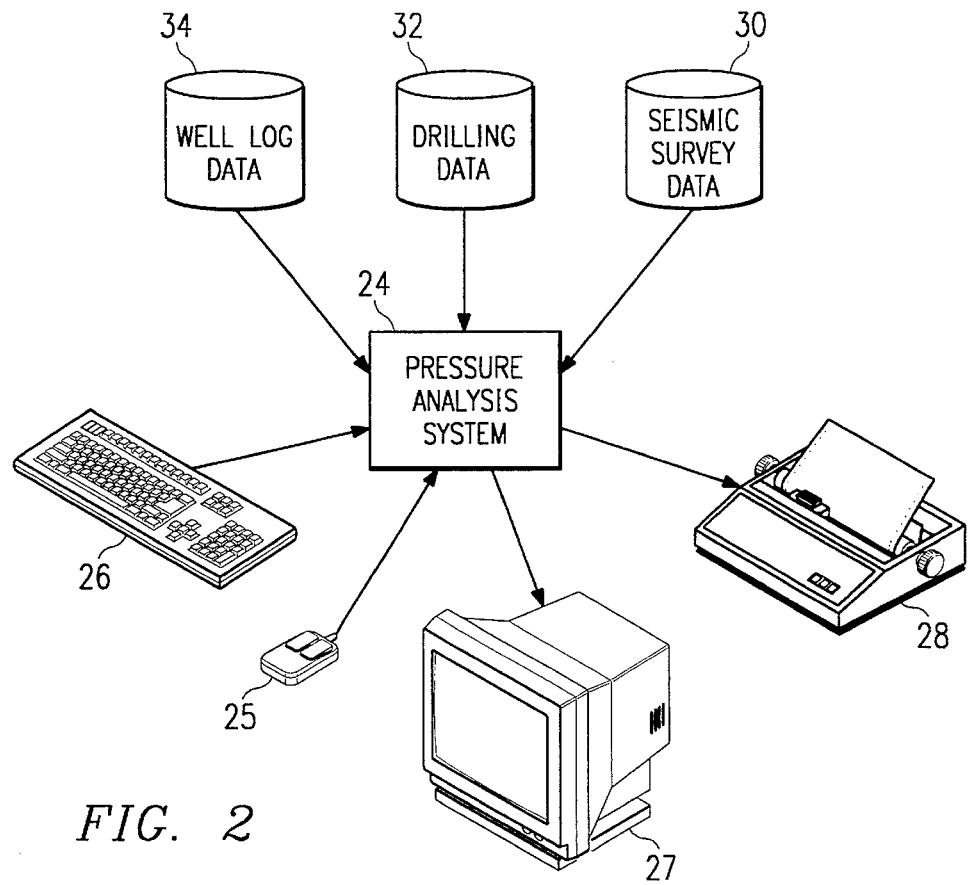
FIG. 2 is an electrical diagram, in block form, of a system for performing the method according to the preferred embodiment of the invention.

Referring now to FIG. 2, a system for determining the pore pressures and fracture gradients according to the preferred embodiment of the invention will now be described. As shown in FIG. 2, the system of the preferred embodiment of the invention includes pressure analysis system computer 24. System computer 24 may be implemented by any conventional personal computer or workstation (e.g., a SPARCstation available from Sun Microsystems, Inc.). System computer 24 may be implemented either in standalone fashion, or as part of a network arrangement. According to the preferred embodiment of the invention, system computer 24 presents output primarily onto graphics display 27, or alternatively via printer 28. Keyboard 26 and mouse 25 are provided with system computer 24 to enable interactive operation in the manner described hereinbelow. System computer 24 is able to communicate with disk storage devices, including external hard disk storage on a network and floppy disk drives. In this embodiment of the invention, system computer 24 is able to retrieve seismic survey data from disk storage 30, drilling measurement and parameter data from disk storage 32, and well log data from disk storage 34. It is contemplated that disk storage devices 30, 32, 34 are implemented by way of a local area network or by remote access. While disk storage devices 30, 32, 34 are illustrated as separate devices, since they correspond to data from different sources at different times, a single disk storage device may of course be used to store any and all of the well log data, drilling parameter, and seismic survey data, as appropriate.

Figure 3:
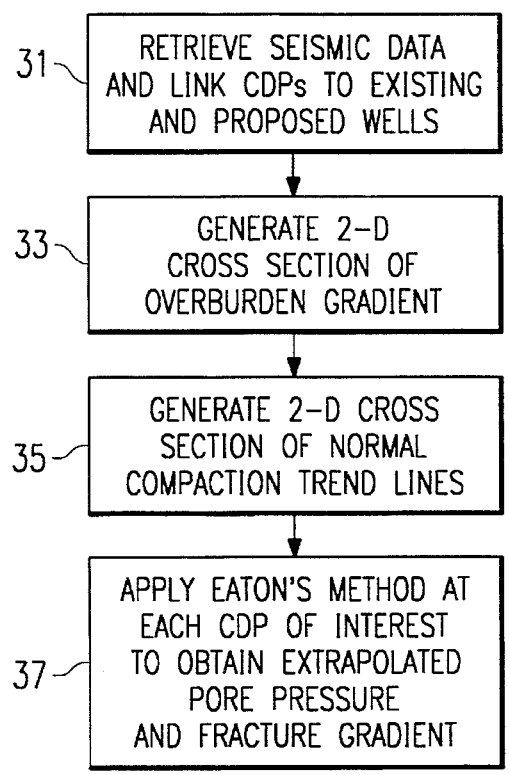
FIG. 3 is a flow chart illustrating a method for producing a 2-D pore pressure cross section according to the preferred embodiment of the invention.

Referring now to FIG. 3, a method of determining pore pressures and fracture gradients for a two-dimensional cross section, including at locations away from existing wells, according to the preferred embodiment of the invention will now be described. In this example, the method of FIG. 3 is performed by the system of FIG. 2; of course, it will be readily appreciated that other computer systems of adequate capacity and performance can also be used to perform the method of the present invention.

The method of FIG. 3 according to the preferred embodiment of the invention begins with process 31, in which seismic data is retrieved by system computer 24 from disk storage 30, for the portion of the survey of interest. For the example of FIG. 1, the seismic data retrieved in process 31 includes the seismic data corresponding to each of the CDP gathers for locations X, and including the location of existing (offset) well 2 and proposed locations 5, 7. In process 31, the retrieved data is linked to these CDPs of interest, including offset well 2 and proposed locations 5, 7, with the interval transit times calculated as a function of depth for each of these CDPs of interest. Of course, if desired, many or all of the CDPs in the survey region may be "of interest", if a 2-D contour of pore pressure and fracture gradient is desired over the entire area. As is well known in the art, the interval transit time corresponds to the zero offset two-way time of acoustic waves within particular formations, and is thus related to the acoustic velocity within specific depth intervals. Accordingly, closely spaced interval transit times can be used to produce acoustic velocity logs at specific CDP locations. In addition, if desired, process 31 may set the various depth units for the seismic data, such as water depth or elevation, at each of the CDP locations of interest.

Figure 4:
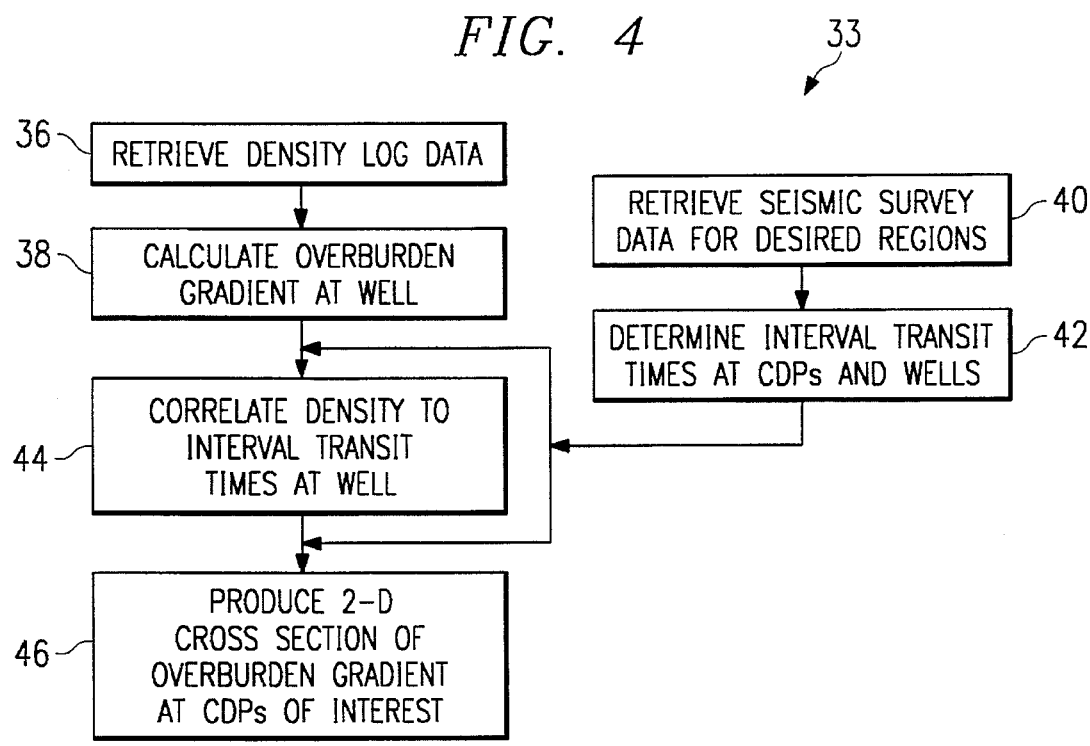
FIG. 4 is a detailed flow chart illustrating a method of producing a 2-D cross section of overburden gradient according to the preferred embodiment of the invention.

Following the retrieval of process 31, process 33 is then performed to generate a 2-D overburden gradient cross section for the CDPs of interest. As is well known in the art, the overburden gradient is a relationship of cumulative average density as a function of increasing depth, and is used in the Eaton method of determining pore pressure gradient. Several techniques may be used to generate the overburden gradient at each of the CDPs of interest in the survey region. Referring now to FIG. 4, a preferred method for generating a 2-D overburden gradient cross section will now be described, in which the 2-D overburden gradient cross section is extrapolated from an overburden gradient calculated from well log data at an existing well site.

This preferred embodiment of process 33, as shown in FIG. 4, begins with process 36, in which well log data is retrieved by system computer 24 from disk storage 34 (see FIG. 2). The well log data retrieved in process 36 corresponds to one or more wells in the region under analysis, such as existing offset well 2. Of course, if more than one logged well exists in the region of interest, the well log data may be retrieved from a selected well in the region, with such selection preferably made by way of a graphical interface with system computer 24. The well log data retrieved in process 36 is preferably that portion pertaining to density of the various structures through which existing well 2 has been drilled. As is well known in the art, a density log of a wellbore is conventionally obtained by directing a beam of gamma rays from the logging tool into the surrounding formation and, using a gamma ray detector in the logging tool at a specified distance from the source, detecting changes in the radiation intensity, as the intensity of detected radiation varies inversely with the density of the formation. Such density log data is retrieved in process 36.

As is well known in the art, log data may be obtained from straight wells such as well 2 of FIG. 1, and also from deviated, or directionally drilled, wells. To the extent that log data is obtained from deviated wells, such directional deviation must be taken into account in retrieval process 36 or in subsequent processes described herein.

Process 38 is then performed, by way of which the overburden gradient at the location of the existing well 2 is determined by system computer 24. As is well known in the art, the overburden gradient is generally calculated by establishing an average trend line through the bulk density data acquired in the density log data retrieved in process 36. This average trend line density is then again averaged, over depth intervals, to define a cumulative overburden curve according to the following relationship:

$$\rho_a(d) = \frac{\Sigma D_i \rho_i}{\Sigma D_i} \quad (1)$$

where:

$D_i$=depth in ft of interval i;

$\Sigma D_i$=d=cumulative depth to depth d;

$\rho_i$=average density (gm/cc) over interval i; and $\rho_i(d)$=cumulative average density to depth d.

Figure 5:
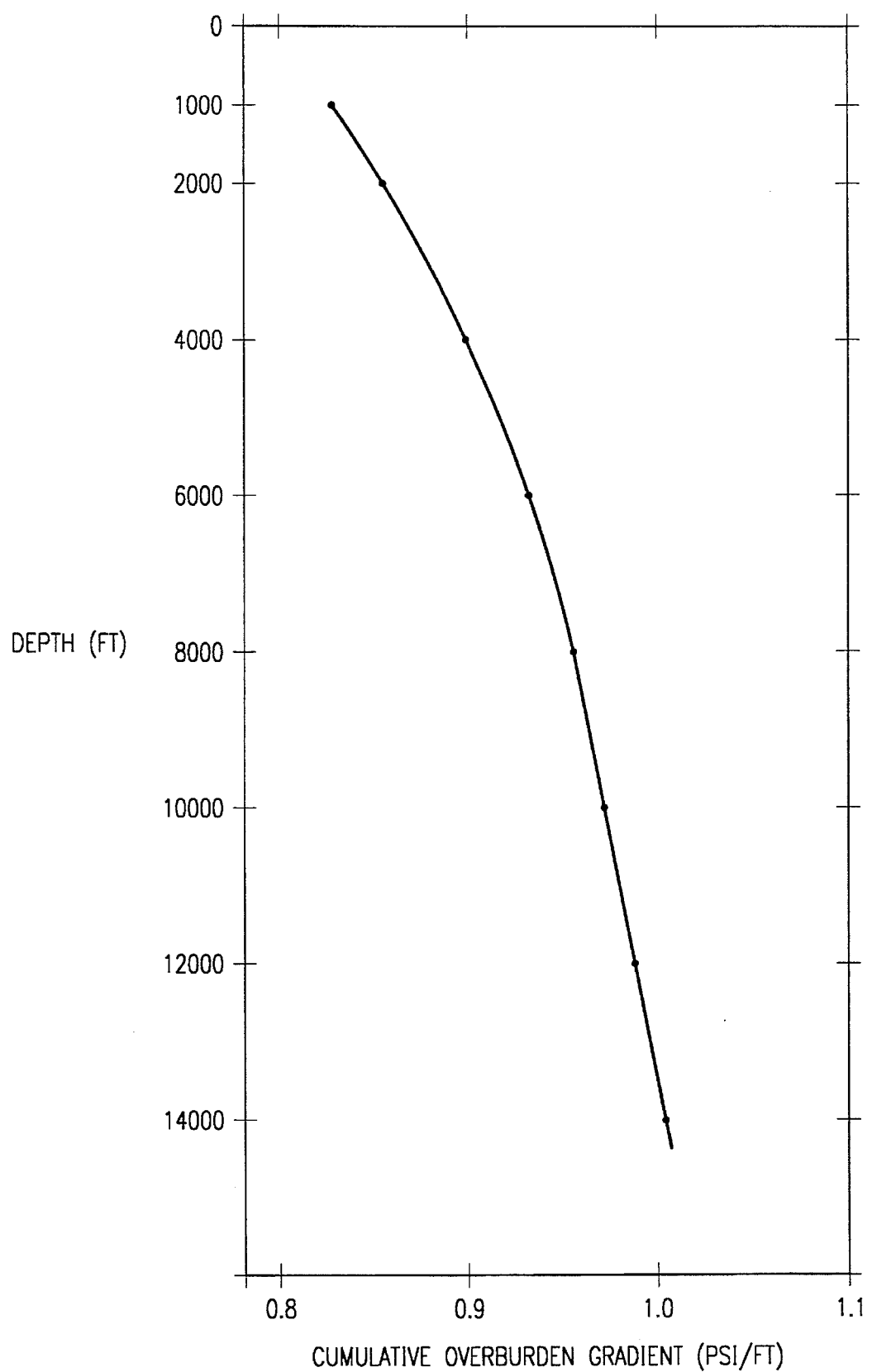
FIG. 5 is a plot of a typical overburden gradient, as useful in the process of FIG. 4.

The overburden gradient S/d is then determined by dividing the value $\rho_i(d)$ by 2.306, to convert the gradient into units of psi/ft, and may be plotted as a function of depth d along the wellbore of the existing well 2. This provides the overburden gradient at the location of existing well 2. FIG. 5 is a typical example of an overburden gradient plot at an existing straight well.

According to this embodiment of the invention, correlation of the overburden gradient from offset well 2 to other CDPs of interest requires correlation of the overburden gradient to interval velocities or transit times in the seismic survey. As such, process 40 is next performed, in which system computer 24 retrieves seismic survey data linked to the CDPs of interest, including the CDP at existing offset well 2. In process 42, system computer analyzes this seismic data to derive interval transit times as a function of depth in the conventional manner. These interval transit times, particularly if derived for uniform depth intervals, relate to the interval velocities of the formations below the CDPs of interest.

In process 44, the overburden gradient at the location of existing well 2 is correlated by system computer 24 to the interval transit times of the CDP corresponding thereto. This correlation enables the extrapolation of the overburden gradient measured at well 2 to other CDPs in the neighboring region, such as the CDPs at proposed well locations 5, 7 of FIG. 1. The correlation of interval transit times to overburden gradient is relatively accurate, given the relationship of acoustic velocity to formation density. Accordingly, in process 46, a 2-D cross section of overburden gradients is produced by generating an overburden gradient, as a function of depth, at each of the CDPs of interest in the region by converting the interval transit times thereat to an overburden gradient using the correlation determined at the location of well 2.

If additional existing logged wells are present in the area, the overburden gradient cross section may be produced by system computer 24 performing the correlation of process 44 at each of the logged well locations, and then producing the overburden gradient in process 46 using a weighted average of the correlation relationships from the differing wells. The weighting may be determined by considering the relative distances of each CDP of interest to the multiple logged wells.

Further in the alternative, process 33 may be implemented by system computer 24 directly converting the interval transit times to a synthetic density cross section without regard to well log data at an offset well, according to one of several algorithms known in the art, such as described in Gardner, et al., "Formation Velocity and Density—The Diagnostic Basics for Stratigraphic Traps", *Geophysics*, Vol. 39, No. 6 (December 1974), pp. 770–71. Still further in the alternative, the overburden gradients may merely be manually set at the CDPs of interest by a human user merely inputting the overburden gradients into system computer 24, based on his or her expertise in evaluating the interval transit time cross section and using other extrinsic knowledge about the physical makeup of the surveyed region.

Figure 6:
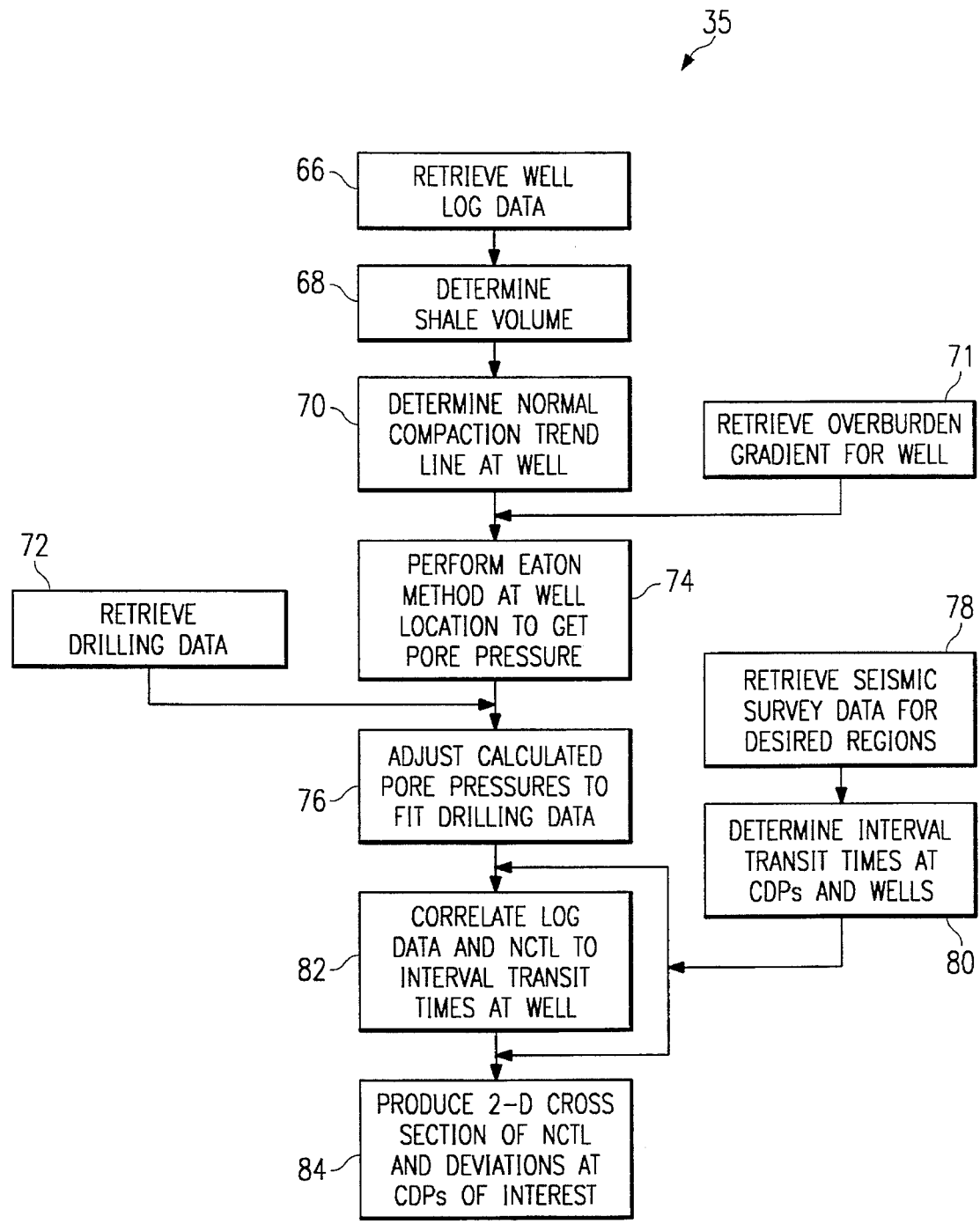
FIG. 6 is a detailed flow chart illustrating a method of producing a 2-D cross section of normal compaction trend lines according to the preferred embodiment of the invention.

Referring back to FIG. 3, once the 2-D cross section of overburden gradient is determined, process 35 is next performed by system computer 24 to generate a 2-D cross section of normal compaction trend lines, one such normal compaction trend line associated with each of the CDPs of interest (that now have an overburden gradient associated therewith from process 33). FIG. 6 illustrates the preferred method of producing a 2-D cross section of normal compaction trend lines, according to this embodiment of the invention.

Process 66 is first performed, in which the appropriate well log data is retrieved from disk storage 34 by system computer 24 to determine the normal compaction trend line at the location of existing well 2. The well log data retrieved in process 66 will be at least that portion of the well log data that identifies formations such as shales, and also that portion of the data indicative of certain formation properties at the wellbore. As is well known in the art, formation identification may be obtained by a conventional gamma-ray log, which measures the natural radioactivity in the surrounding formations, or by a conventional spontaneous potential (SP) log, which measures the potential induced be drilling through sand-shale interfaces possessing membrane potential. Well log data corresponding to formation properties, particularly for shales, may be obtained from the conventional technique of electrically sonic velocity logging, which measures the velocity of acoustic waves through surrounding formations by generating acoustic waves at one point of the logging tool and measuring their receipt at spaced-apart receivers; formation properties also may be measured via conventional conductivity or resistivity measurements along the wellbore, as is also well known.

Figure 7:
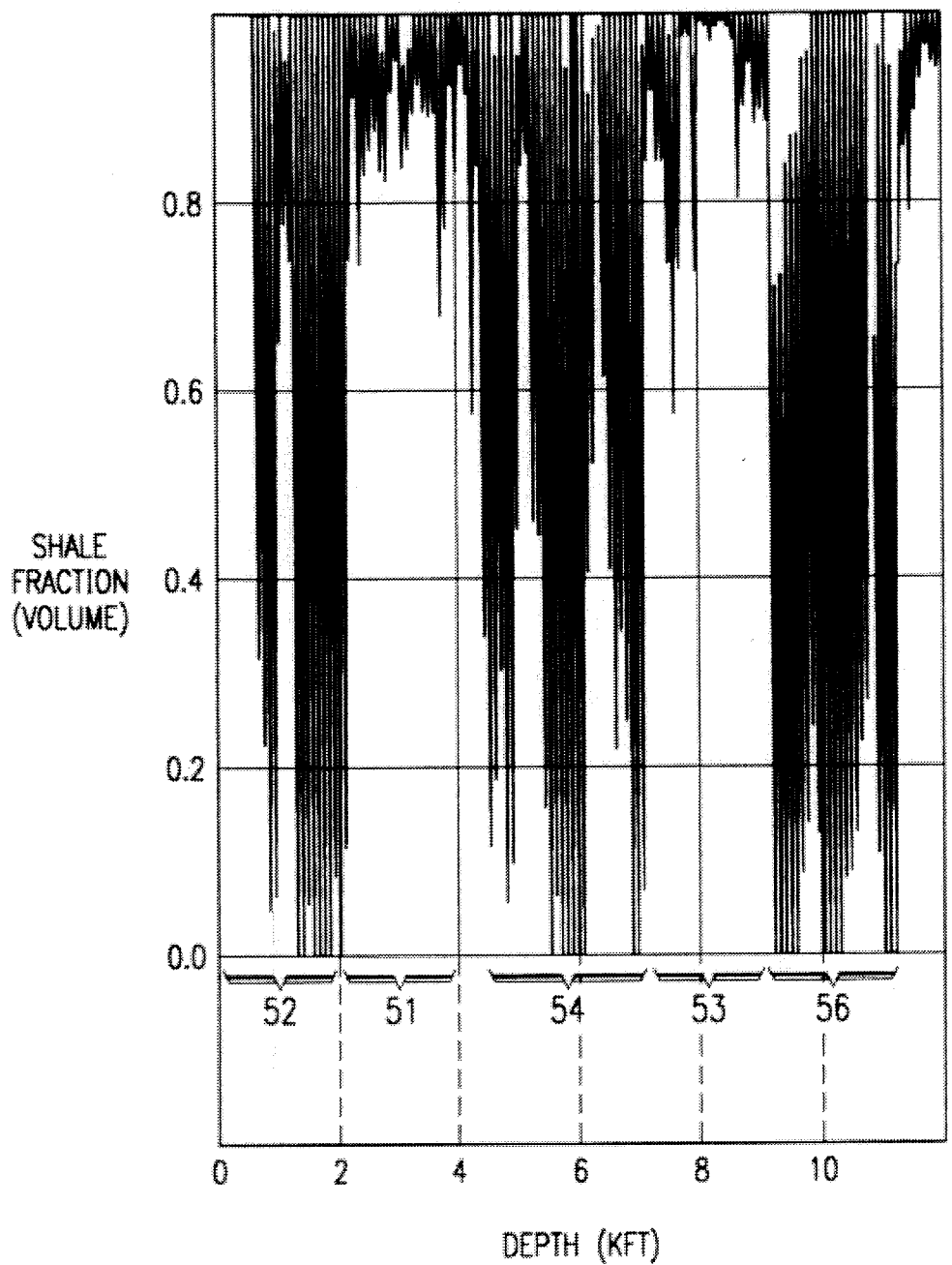
FIG. 7 is a typical plot of shale fraction versus depth, as useful in the process of FIG. 6.

Using the well log data retrieved in process 66, process 68 is then performed to determine the fraction of shale in the volume of the formation surrounding the wellbore of existing well 2. This determination is desirable in order to develop the most representative normal compaction trend line at the location of well 2. The determination of the shale volume in process 68 from the gamma-ray log or SP data retrieved in process 66, either by way of manual estimation based upon the particular log data, or by system computer 24 operating according to an automated method of shale fraction estimation as described in the above-incorporated U.S. Pat. No. 5,130,949. In either case, the result of process 68 is a shale volume log of the volume of shale as a fraction of the total volume, as a function of depth. According to this example, the non-shale remainder of the formation is presumed to be sand; accordingly, this exemplary embodiment is primarily directed to geologies that are primarily sand and shale. FIG. 7 is an exemplary shale fraction log based upon a typical well, in which the depth layers indicating a substantially uniform high fraction of shale (e.g., regions 51, 53) correspond to shale formations, and those having wide ranges of shale fraction extending toward very low fraction shale (e.g., regions 52, 54, 56) correspond to formations that are primarily sand.

Once the shale fraction log of process 68 has been obtained, the normal compaction trend line at existing well 2 is next determined in process 70. As discussed hereinabove, the normal compaction trend line corresponds to the expected increase in density of shale formations as a function of depth, due solely to increasing hydrostatic pressure (i.e., assuming no trapping of fluids, or geopressure). Certain formation properties, such as acoustic velocity, conductivity, and resistivity, are indicative of the pressure within subsurface formations, and thus are useful in process 68 to derive the normal compaction trend line at existing well 2, as is well known. The normal compaction trend line is determined, in process 70, by considering only the log parameters for those regions that are primarily shale, as indicated by the shale volume log produced in process 68, as sands are substantially incompressible. As described in the above-referenced U.S. Pat. No. 5,130,949, only those log parameters at locations that are within a layer having more than a threshold thickness and greater than a threshold fraction shale content are to be considered; for example, only log data from locations that are within layers of 90% or greater shale content and that are at least ten feet in thickness are to be considered. Log data points at depths other than those meeting the selected parameters are then discarded.

The normal compaction trend line may be produced, in process 70, by any one of a number of techniques. Preferably, system computer 24 performs a best-fit linear regression of the log data at the valid shale depths. Alternatively or in addition to an automated regression, manual placement of the normal compaction trend line by a human user may be performed via mouse 25 or keyboard 26, either to set the line originally or to edit the placement made by the automated linear regression. The normal compaction trend line may be a line of single slope and intercept, or it may be composed of a family of lines having multiple slopes and intercepts, reflecting changes in compaction trend (i.e., non-conformity).

Figure 8A:
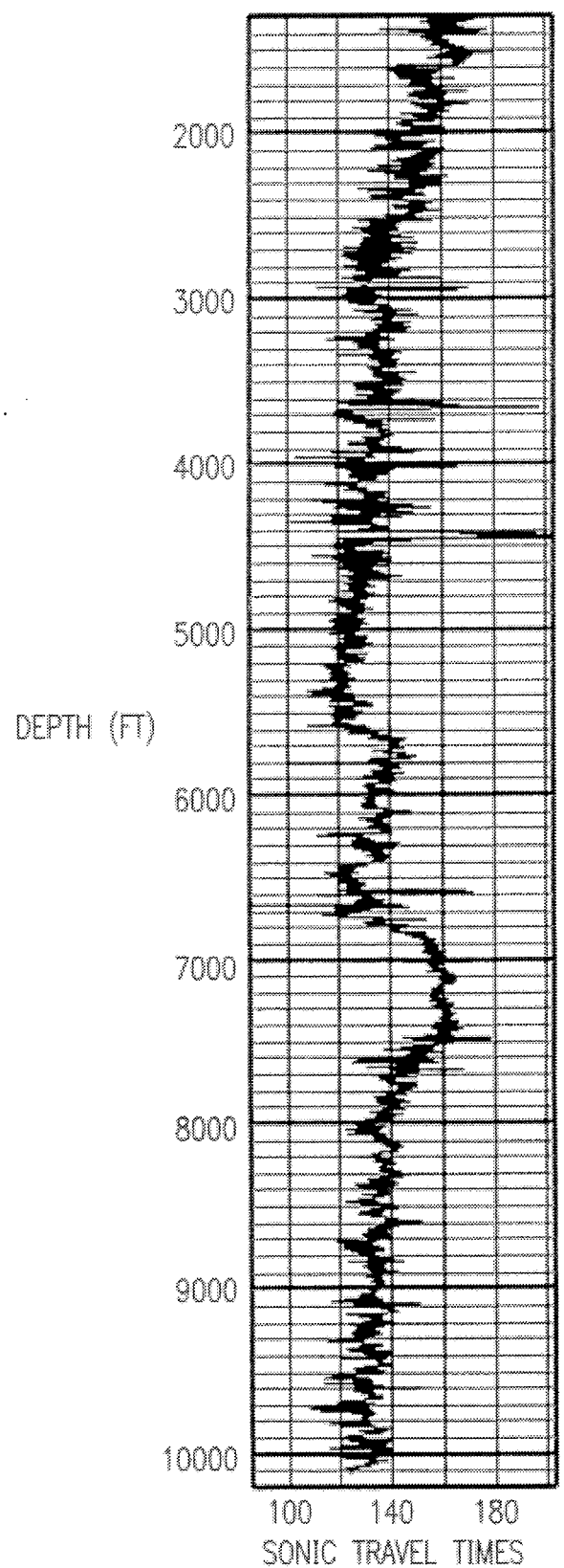
FIGS. 8a, 8b, 8c are plots of log data, normal compaction trend line, pore pressure gradient and fracture gradient as useful in the process of FIG. 6.
Figure 8B:
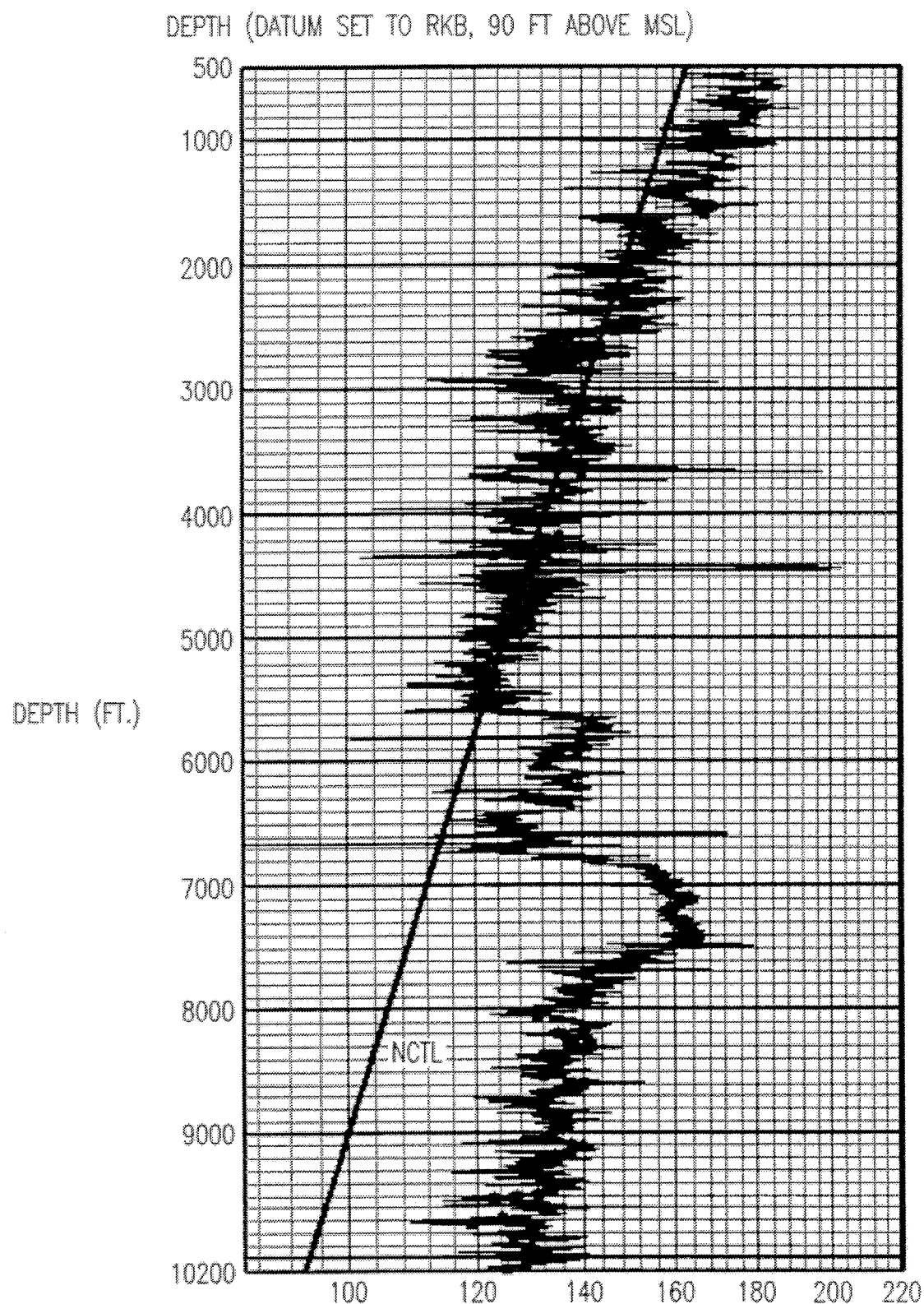

FIG. 8a illustrates typical sonic log data taken along a wellbore, from which a normal compaction trend line is to be determined. The data points in FIG. 8a are, in this example, average sonic travel time readings as a function of depth, at those depths within layers that are at least 90% shale and at least ten feet in thickness. FIG. 8b illustrates a normal compaction trend line NCTL that has been generated in process 40 for the log data of FIG. 8a. As is evident in the example of FIG. 8b, the lower depth sonic measurements tend to follow the normal compaction trend line, but significant deviations of lower sonic travel time are indicated in layers at depths beginning at around 6000 feet. As an aside, it is preferable to allow display of the depths in FIGS. 8a and 8b relative to a selected one of mean sea level, the kelly bushing of well 2, or any other user-specified zero datum. FIG. 8b, for example, indicates that the depths are relative to the kelly bushing of the well, which is at 90 feet above mean sea level.

Once the normal compaction trend line is established at the location of well 2, process 71 is performed in which system computer 24 retrieves the overburden gradient for well location 2 from its memory. The overburden gradient is preferably that generated in process 33 (specifically process 38) described hereinabove, but of course may be determined by other techniques as appropriate.

With both the normal compaction trend line and the overburden gradient established at the location of well 2, the Eaton method is applied in process 74 by system computer 24 to generate a profile of pore pressures at the location of well 2, in the manner well known in the art, as described in Eaton, "The Equation for Geopressure Prediction from Well Logs", SPE 5544 (Society of Petroleum Engineers of AIME, 1975), incorporated herein by this reference. In brief summary, the Eaton method determines a formation pressure gradient according to the following relationship:

$$P = GG - (GG - P_n) * \left\{ \frac{\Delta t_{normal}}{\Delta t_{observed}} \right\}^{3.0} \quad (2)$$

where:

P is the formation pressure gradient (psi/foot)

GG is the overburden gradient (psi/foot)

$P_n$ is the formation pressure at depth D along the normal compaction trend line;

$\Delta t_{normal}$ is the sonic travel time at depth D along the normal compaction trend line; and $\Delta t_{observed}$ is the observed travel time at depth D.

Figure 8C:
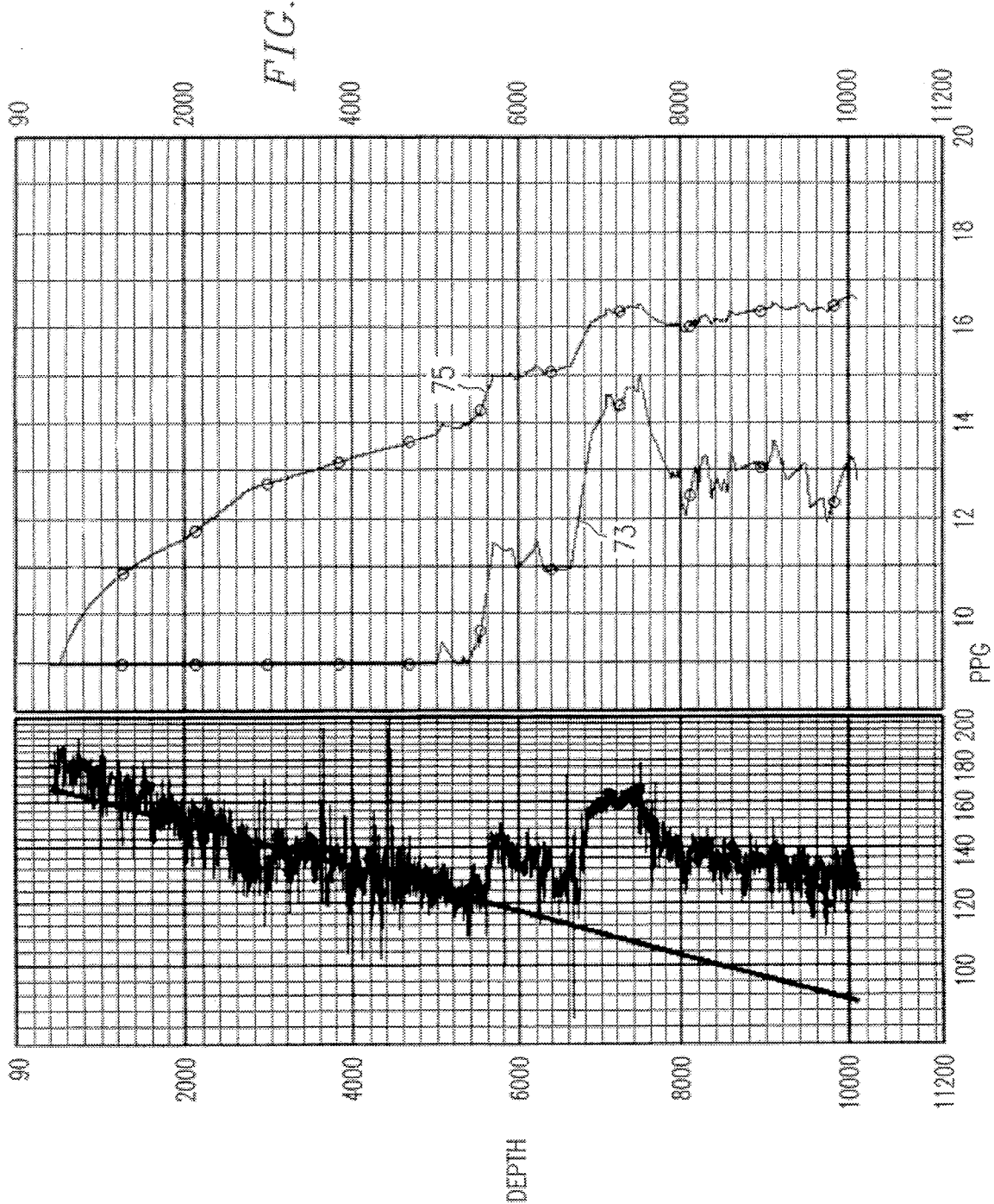

Of course, the sonic travel time values $\Delta t_{normal}$ and $\Delta t_{observed}$ can be readily determined from the sonic log plots of FIG. 8a and 8b. Plotting or tabulating the calculated pore pressures at a number of intervals using the Eaton method will provide a pore pressure cross section at well location 2. FIG. 8c is an example of a pore pressure plot, illustrated adjacent to a corresponding normal compaction trend line and sonic log data as shown by plot 73 in FIG. 8b (which is the preferable display format on graphics display 27 according to this embodiment of the invention).

If desirable at this time, a fracture gradient may also be readily derived by system computer 24 from the pore pressure gradient using Poisson's ratio for rock, as described in Eaton, "Fracture Gradient Prediction and Its Application in Oilfield Operations", *Transactions of SPE 43rd Annual Fall Meeting of SPE*, Vol. 46 (American Institute of Mining, Metallurgical and Petroleum Engineers, 1969), incorporated herein by this reference. Plot 75 in FIG. 8b illustrates the fracture gradient associated with the pore pressure gradient of plot 73, and on the same display with the normal compaction trend line and well log data, as shown. This simultaneous display is preferable, so that the human user is able to visually correlate the behavior of these data.

Process 72 is now preferably performed by system computer 24 to retrieve, from disk storage 32, drilling parameters pertaining to the drilling of well 2. Specifically, the mud pressure data observed, as a function of drilling depth, during the drilling process is particularly useful, as these data can be correlated to the pore pressure gradient plot generated in process 74. Process 76 may then be performed, in which the pore pressure gradient is adjusted, for example by way of a graphical interface using mouse 25 or keyboard 26, so as to correspond to the actual mud pressure data obtained during the drilling process. The normal compaction trend line may then be adjusted for well 2 to match the known pressures at well 2.

As in the generation of the overburden gradient in process 33 described hereinabove, processes 78, 80 are performed in which system computer 24 retrieves seismic survey data from disk storage 30 for the region containing the CDPs of interest, and determines interval transit times for those CDPs of interest including the CDP associated with well 2; of course, if these interval transit times were previously determined in process 33, they need not be regenerated again in process 78 but instead may merely be retrieved from memory. In process 82, the interval transit times for the CDP at the location of well 2 are correlated by system computer 24 to the adjusted normal compaction trend line and to log readings deviating therefrom. The correlation of process 82 thus will provide the basis for extrapolating the normal compaction trend line and deviating log data to locations away from well 2 for which no well log data exists.

Once the correlation of process 82 is obtained, process 84 is now performed by system computer 24 to produce a 2-D cross section of normal compaction trend lines and deviations therefrom for the CDPs of interest, using the interval transit times calculated therefor in process 80 and the correlation established in process 82. Accordingly, a normal compaction trend line and deviations in "log data" are established at each of the CDPs of interest, such that each of these CDPs will have an extrapolated plot similar to that of FIG. 8b, based on the interval transit times thereat.

Other techniques may alternatively be used to produce a 2-D cross section of normal compaction trend lines and deviations therefrom. For example, a curve fitting approach similar to that of the above-incorporated U.S. Pat. No. 5,130,949 may be used to generate extrapolated normal compaction trend lines based on interval transit times. Further in the alternative, if multiple offset wells are in the area, a weighted sum interpolation may be performed to produce normal compaction trend lines and correlated log data at CDPs therebetween.

Referring back to FIG. 3, process 37 may now be performed at each of the CDPs of interest to produce pore pressure and fracture gradient information thereat, using the Eaton method. Process 37 uses equation (2) noted hereinabove to generate the pore pressure, with the data applied thereto being that determined by the extrapolation of process 84. The Eaton relationship for this extrapolation expresses the pore pressure gradient $P_{cdp}$ at a CDP of interest as follows:

$$P_{cdp} = \{GG_{extr} - (GG_{extr} - P_n)\} * \left\{ \frac{\Delta t_{esnorm}}{\Delta t_{extr}} \right\}^{3.0} \quad (3)$$

where:

$GG_{extr}$ is the extrapolated overburden gradient at depth D for the CDP of interest;

$P_n$ is the formation pressure at depth D along the normal compaction trend line;

$\Delta t_{estnors}$ is the estimated sonic travel time at depth D along the extrapolated normal compaction trend line; and $\Delta t_{extr}$ is the extrapolated sonic travel time at depth D.

Using the pore pressure gradient established in process 37, the user may also readily generate a fracture gradient for the 2-D cross section of CDPs of interest, using the Poisson's ratio for rock, described in the above-incorporated Eaton article. Accordingly, pore pressure and fracture gradient plots, such as that shown in FIG. 8c for a well location, may be generated and displayed on graphics display 27, for use in well planning. Alternatively or additionally, system computer 24 may provide printed hard copy output of the pore pressure and fracture gradient plots.

The pore pressure gradient and fracture gradient established in process 37, based upon the extrapolated overburden gradient and normal compaction trend lines, is contemplated to be improved over extrapolated trend curve analysis, as it takes advantage of the empirically established Eaton relationship between resistivity deviation from normal compaction and the overburden gradient. Furthermore, the method according to the embodiment of the invention described hereinabove is readily verified and adjusted according to well log data and drilling data that has been obtained at existing offset wells. In addition, the method of the preferred embodiment of the present invention is clearly advantageous over prior Eaton analysis, which was necessarily limited to formations surrounding existing boreholes.

As a result of the method of the present invention, accurate indication both of overpressurized zones and of low pressure formations that are subject to fracture may be generated in an interactive yet automated fashion. These estimates are therefore not only obtained in a less time-consuming manner, but are also believed to be more accurate, especially through the use of the Eaton method extrapolated away from offset well locations. The present invention therefore has importance in improving the safety of new hydrocarbon wells, while minimizing the cost associated with overdesign of casing strings.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to generate a pore pressure gradient profile at a proposed drilling location of the earth away from an existing well, comprising the steps of:

retrieving, from memory, seismic survey information for the portion of the earth including the proposed drilling location and a well location corresponding to the existing well;

generating a two-dimensional overburden gradient cross section for a region including the proposed drilling location, based upon the retrieved seismic survey data;

generating a two-dimensional normal compaction trend line data cross section for the region including the proposed drilling location, based upon the retrieved seismic survey data; and generating a pore pressure gradient for the proposed drilling location by applying the Eaton method to the overburden gradient and normal compaction trend line data for the proposed drilling location.

2. The method of claim 1, further comprising:

after the step of generating a pore pressure gradient, generating a fracture gradient by applying Poisson's ratio for rock to the pore pressure gradient.

3. The method of claim 1, wherein the step of generating a two-dimensional overburden gradient cross section comprises:

retrieving, from memory, well log data obtained from the existing well;

from the retrieved well log data, generating an overburden gradient for the well location;

correlating the retrieved seismic survey data for the well location to the overburden gradient for the well location; and after the correlating step, generating a two-dimensional overburden gradient cross section for the proposed drilling location from the retrieved seismic survey data.

4. The method of claim 3, further comprising:

generating interval transit times for a plurality of common depth points from the retrieved seismic survey data; and using the generated interval transit times in the correlating and generating steps.

5. The method of claim 1, wherein the step of generating a two-dimensional overburden gradient cross section comprises:

generating a synthetic density cross section from the seismic survey data; and generating overburden gradients at each of a plurality of locations from the synthetic density cross section.

6. The method of claim 1, wherein the step of generating a two-dimensional normal compaction trend line data cross section comprises:

retrieving well log data for the existing well;

generating a normal compaction trend line for the well log data, corresponding to the well location;

correlating the normal compaction trend line and well log data deviating therefrom for the well location to the retrieved seismic survey data corresponding to the well location; and generating normal compaction trend lines and extrapolated deviating well log data for the proposed drilling location from the retrieved seismic survey data corresponding thereto.

7. The method of claim 6, further comprising;

after the step of retrieving well log data and before the step of generating a normal compaction trend line, determining the fraction shale content for a plurality of depth intervals at the well location from the retrieved well log data.

8. The method of claim 6, further comprising:

after the step of generating a normal compaction trend line for the well log data, generating a pore pressure gradient at the well location from the normal compaction trend line for the well location.

9. The method of claim 8, further comprising:

retrieving, from memory, drilling mud pressure data obtained during drilling of the existing well; and correlating the retrieved drilling mud pressure data with the pore pressure gradient for the well location.

10. The method of claim 9, further comprising:

adjusting the normal compaction trend line for the well location responsive to the step of correlating the retrieved drilling mud pressure data with the pore pressure gradient for the well location.

11. The method of claim 8, further comprising:

generating an overburden gradient at the well location from the retrieved well log data;

wherein the step of generating a pore pressure gradient at the well location from the normal compaction trend line is performed by applying the Eaton method to the overburden gradient and normal compaction trend line data for the well location.

12. The method of claim 8, further comprising:

generating a fracture gradient at the well location from the pore pressure gradient for the well location, using Poisson's ratio for rock.

13. The method of claim 1, wherein the step of retrieving seismic survey data retrieves seismic survey data for a plurality of common depth points;

and wherein the step of generating a pore pressure gradient generates a pore pressure gradient for each of the plurality of common depth points.

* * * * *